United States Patent
Ando et al.

(10) Patent No.: US 6,549,887 B1
(45) Date of Patent: Apr. 15, 2003

(54) APPARATUS CAPABLE OF PROCESSING SIGN LANGUAGE INFORMATION

(75) Inventors: Haru Ando, Kodaira (JP); Hirohiko Sagawa, Kokubunji (JP); Masaru Takeuchi, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/488,076

(22) Filed: Jan. 20, 2000

(30) Foreign Application Priority Data

Jan. 22, 1999 (JP) .......................................... 11-013973

(51) Int. Cl.⁷ .......................... G10L 21/06; G06T 13/00
(52) U.S. Cl. ...................... 704/271; 345/474; 345/723
(58) Field of Search .......................... 704/271; 345/723, 345/474

(56) References Cited

U.S. PATENT DOCUMENTS

| | | | | |
|---|---|---|---|---|
| 5,734,923 A | * | 3/1998 | Sagawa et al. | 707/500.1 |
| 5,982,853 A | * | 11/1999 | Liebermann | 379/52 |
| 6,377,925 B1 | * | 4/2002 | Greene, Jr. et al. | 704/271 |

FOREIGN PATENT DOCUMENTS

| | | | | |
|---|---|---|---|---|
| EP | 0 585 098 A2 | * | 3/1994 | G06K/9/00 |
| JP | 11-52987 | | 2/1999 | |

OTHER PUBLICATIONS

"Digital Speech Processing", S. Furui et al, University Publishing Section, pp. 177–185.
Transactions of the 54th Nationwide Meeting of Information Processing Society of Japan, 1997.

* cited by examiner

*Primary Examiner*—Tālivaldis Ivars Šmits
(74) *Attorney, Agent, or Firm*—Mattingly, Stanger & Malur, P.C.

(57) ABSTRACT

Inputted sign language word labels and editing items such as speeds and positions of moving portions for specifying manual signs and/or sign gestures corresponding to the respective sign language word labels are displayed on an editing screen. These editing items are modified by the user to add non-language information such as emphasis/feeling information to the contents of communication, thereby generating modified sign language animation information data including the inputted sign language word label string having the added non-language information. For communication or interaction, the non-language information is extracted from the modified sign language animation information data and stored into a memory with the inputted sign language word label string. When a hearing impaired person communicates or interacts with another person through text, the user can emphasize the contents of communication or show the user's feeling for the contents of communication to the other person.

11 Claims, 18 Drawing Sheets

FIG.5

| | | | | | | | |
|---|---|---|---|---|---|---|---|
| 4044 | | LEFT HAND | | | | | |
| 4043 | SIGN GESTURE DATA | RIGHT HAND | DIRECTION CHANGE POINT | | | A | |
| 4042 | | | REPOSE POINT | | A | A | |
| | | | THUMB | --- | --- | --- | --- | --- |
| | | | 1 | | | | |
| 404 | | | WRIST | Z | | | | |
| | | | | Y | | | | |
| | | | | X | | | | |
| 40421 | | | ELBOW | Z | 13 | 19 | 25 | 30 |
| | | | | Y | 17 | -10 | -23 | -34 |
| 4041 | | | | X | 1 | -5 | -6 | -20 |
| 403 | LAPSE TIME | | | | T1 | T2 | T3 | .. | Tn |
| | PART OF SPEECH | | | | PERSONAL PRONOUN | | COMMON NOUN |
| 402 | SIGN LANGUAGE WORD LABEL | | | | I | | MOUNTAIN |
| 401 | NATURAL LANGUAGE WORD | | | | I | | MOUNTAIN |
| 400 | ENTRY NUMBER | | | | 1 | | 2 |

FIG.8

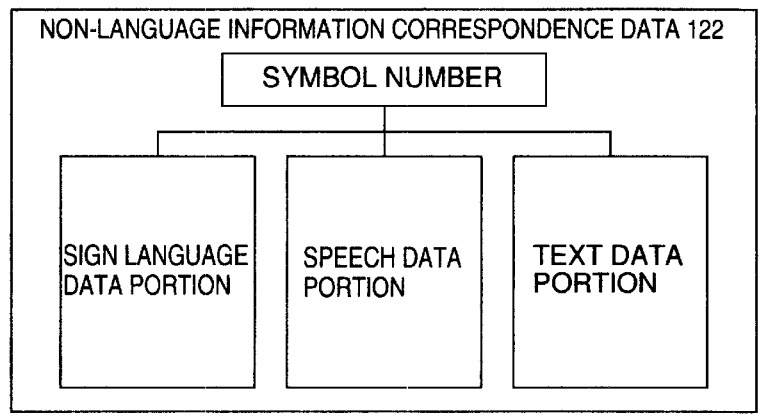

NON-LANGUAGE INFORMATION CORRESPONDENCE DATA 122
- SYMBOL NUMBER
  - SIGN LANGUAGE DATA PORTION
  - SPEECH DATA PORTION
  - TEXT DATA PORTION

FIG.9

| SYMBOL NUMBER (901) | COMPARISON ITEM (902) | | | CHARACTERICS FOR COMPARISON MODEL (903) | NON-LANGUAGE INFORMATION MODEL (904) |
|---|---|---|---|---|---|
| 0_1 | GRAMMAR INFORMATION | | | COMPARISON WITH SVO | SVO |
| | | | | COMPARISON WITH CVS | SVC |
| | GESTURE CHARACTERISTICS | DURATION OF WORD | | (ACTUAL MEASUREMENT VALUE) / (STANDARD DURATION) >=1.2 | (STANDARD DURATION) * 1.2 |
| | | LOCUS | | (1)(ACCELERATION VALUE BETWEEN REPOSE POINTS) / (STANDARD ACCELERATION VALUE) >=1.2 (2)(REPOSE POINT STAY DURATION) / (STANDARD STAY DURATION) >=1.2 (3)(ACCELERATION VALUE BETWEEN DIRECTION CHANGE POINTS) / (STANDARD ACCELERATION VALUE) >=1.2 | (1) (STANDARD ACCELERATION VALUE) * 1.2 (2) (STANDARD STAYDURATION) * 1.2 (3) (STANDARD ACCELERATION VALUE) * 1.2 |
| 0_2 | DURATION OF WORD | | | | |
| 0_3 | DURATION OF WORD | | | | |
| 0_4 | DURATION OF WORD | | | | |
| ⋮ | ⋮ | | | ⋮ | ⋮ |

FIG.10

| SYMBOL NUMBER | COMPARISON ITEM | CHARACTERICS FOR COMPARISON MODEL | NON-LANGUAGE INFORMATION MODEL |
|---|---|---|---|
| 0_1 | GRAMMAR INFORMATION | COMPARISON WITH SVO | SVO |
| | | COMPARISON WITH SVC | SVC |
| | DURATION OF WORD | (LENGTH[m][0]) / (STANDARD VOCALIZATION VALUE) >=1.2 | (STANDARD DURATION) * 1.2 |
| | DURATION OF SILENCE BETWEEN WORDS | (LENGTH[m][1]) / (STANDARD DURATION OF SILENCE BETWEEN WORDS) >=1.2 | (STANDARD DURATION OF SILENCE BETWEEN WORDS) * 1.2 |
| | INTONATION IN WORD | (PITCH GRADIENT AT BEGINNING POINT OF WORD DETERMINED FROM P) / (STANDARD VALUE OF PITCH GRADIENT) >=1.2 | (STANDARD VALUE OF BEGINNING PITCH GRADIENT) * 1.2 |
| 1_1 | INTONATION | | |
| | MEAN PITCH | | |
| | DURATION | | |
| 1_2 | INTONATION | | |
| | DURATION | | |
| 1_3 | INTONATION | | |
| | DURATION | | |
| ⋮ | ⋮ | ⋮ | ⋮ |

Columns: 1001, 1002, 1003, 1004

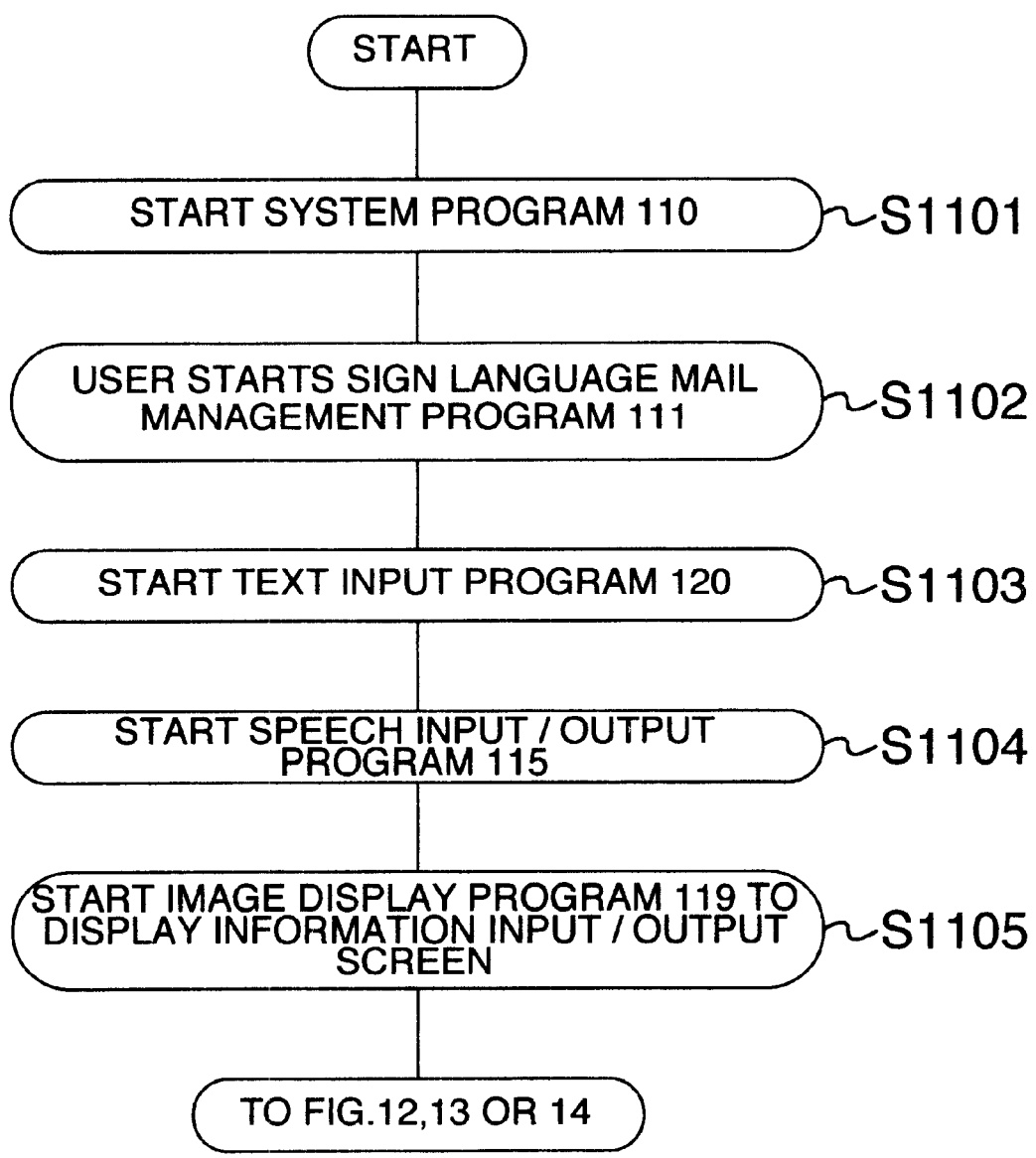

APPARATUS CAPABLE OF PROCESSING SIGN LANGUAGE INFORMATION

BACKGROUND OF THE INVENTION

The present invention relates to an apparatus capable of processing sign language information, and more particularly to an information processing apparatus for generating a sign language animation to send information of the sign language animation as mail message information and/or reproducing received mail message information as a sign language animation.

In recent years, there is a tendency to structure not a special service system for impaired persons but a system in which impaired persons are also included in the coverage of a service enjoyed by normal persons in order that the impaired persons can enjoy the service similarly to the normal persons. This may also be judged from the advancement of universal designs.

However, such a tendency has begun to appear only just recently. Under present conditions, apparatuses having the materialization of such service systems to be structured are few and far between.

When attention is focussed on hearing impaired persons, it seems that the utilization of electronic mails between them is beginning to make progress.

However, since a sign language is generally used in the interaction or conversation between hearing impaired persons, it may be considered as being difficult to obtain such a natural interaction (or naturalness) as can be obtained in the case where a hearing person writes a mail message by use of a spoken language.

SUMMARY OF THE INVENTION

If it becomes possible to send by mail a sign gesture which is interaction means natural to hearing impaired persons, it may be considered that in the exchange of a mail between hearing impaired persons, a conversation nearer to the natural interaction is attainable as in the case of that between hearing persons. Accordingly, it is required to structure means for enabling a hearing impaired person to send and receive a sign gesture as a mail. It is not always that both of the mail sender side and the receiver side are hearing impaired persons. There may be the case where the sender side is a hearing impaired person while the receiver side is a hearing person or the case where the sender side is a hearing person while the receiver side is a hearing impaired person.

Accordingly, there is required means with which information represented by a hearing impaired person through a sign language is translated into a medium such as text information available to a hearing person. Further, there is required means with which text information or the like inputted by a hearing person is translated into sign language information which is a medium available to a hearing impaired person. Also, in the case where inputted information is sign language information, the input information may include not only language information but also non-verbal "non-language" information such as emphasis information and/or feeling information. Therefore, in the case where the transmission is made from a hearing impaired person or from a hearing impaired person to a hearing person, there is required means for making such translation of such non-language information.

Also, in the case where text information is translated into sign language information, the acquisition of an interaction nearer to a natural interaction as obtained when a hearing person writes a mail message by use of a spoken language becomes possible if there is means for adding non-language information such as emphasis information and/or feeling information to the text information.

According to one aspect of the present invention, there is provided an information processing apparatus comprising information input means capable of inputting at least information such as a text or the like, animation information generation means for generating sign language animation information by use of sign language word label information, information storage means for storing input information such as a text or the like and sign language word label information or the like, information display means for displaying the text information and the animation information, and communication means for sending and receiving information through a communication line or the like, wherein non-language information is extracted from modified sign language animation information data obtained through the user's editing of animation information generated on the basis of sign language word labels, and the sign language word labels and the non-language information are sent by use of the communication means. On the receiver side, the sign language word labels and non-language information sent from the sender side are translated into data having an output form of sign language animation, text display or speech output which is set on the receiver side or the sender side.

For the translation of data form, there is prepared non-language information correspondence data concerning sign language information, text information and speech information. Also, a difference value between modified sign language animation information data obtained through the user's addition of emphasis representation and/or feeling representation to original sign animation information generated by the sign language animation information generation means from sign language word label string information and the original sign animation information data before addition is determined, and non-language information including emphasis representation and/or feeling representation is extracted on the basis of the determined difference value.

In the case where the user inputs a natural language text and sends the inputted text, the receiver side analyzes the received text by use of morphological analysis means. Adjacent ones of divisional words obtained as the result of analysis are coupled to generate coupled words. The divisional word may further be divided. Natural language words in natural language word to sign language word label correspondence data stored in the information storage means are divided to generate divisional words. The coupled words or the divisional words as generated are collated with the natural language word to sign language word label correspondence data to extract sign language word labels, thereby generating a sign language word label string.

The addition of emphasis information and/or feeling information is also made possible on a text.

When an emphasis portion or feeling applied portion as a non-language information representation portion is designated or specified on the text, the designated portion is stored as the emphasis portion or feeling applied portion and non-language information is added to language sign animation data corresponding to that portion.

In the case where the user inputs a speech, vocalization information is A/D-translated. Vocal sound information, sound pressure information, sound pitch information and time information are acquired from the translated vocalization information. Further, non-language information including emphasis information and/or feeling information is extracted from the contents of the inputted speech and the extracted non-language information is displayed as a sign language representing animation.

In the case where the user designates the output in the form of a speech, sign language animation information is translated into speech information through speech synthesis by use of non-language information inclusive of emphasis representation information and/or feeling representation information extracted from modified sign language animation data and the resultant speech information is outputted for the user.

BRIEF DESCRIPTION OF THE DRAWINGS

FIG. 5 is a diagram showing an example of the structure of natural language word to sign language word label correspondence data 121 used by the sign language generation program 113 shown in FIG. 1;

FIG. 8 is a diagram showing an example of the structure of non-language information correspondence data 122 shown in FIG. 1;

FIG. 9 is a diagram showing an example of the structure of a sign language data portion of the non-language information correspondence data 122 shown in FIG. 8;

FIG. 10 is a diagram showing an example of the structure of a speech data portion of the non-language information correspondence data 122 shown in FIG. 8;

FIG. 11 is a flow chart of a processing performed prior to mail sending in an embodiment of the present invention;

DESCRIPTION OF THE PREFERRED EMBODIMENTS

Embodiments of the present invention will now be described in reference to the drawings. A system disclosed as the embodiment is a system capable of handling sign gesture (or sign language animation), text and speech information. The system is a system having a function with which language information and non-language information included in sign language animation information is translated into text or speech information, a function with which language information and non-language information included in text or speech information are translated into sign language animation information, and a function with which such language information and non-language information are sent and/or received on a mail communication system, as required.

Figure 1:
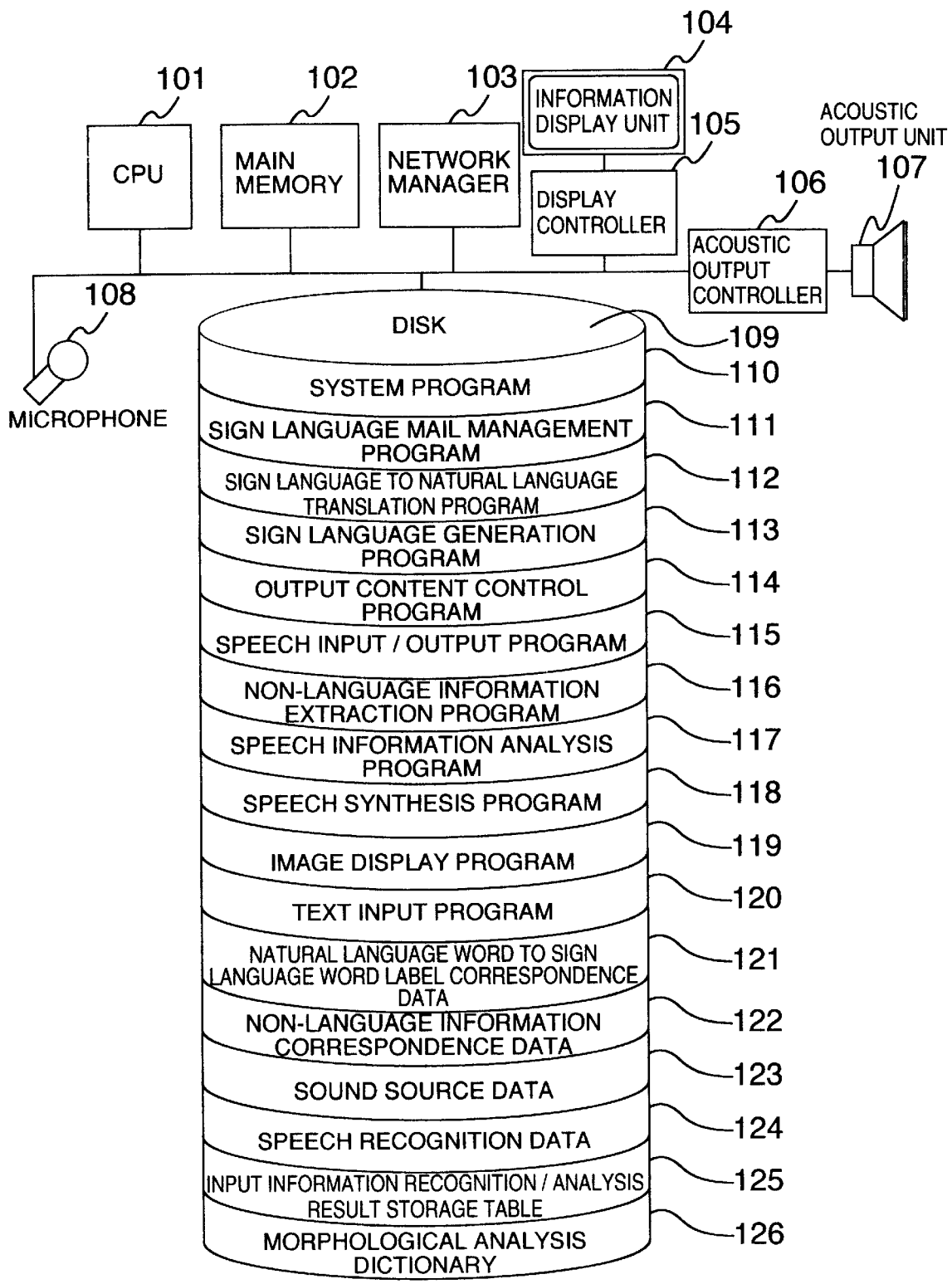
FIG. 1 is a block diagram showing the construction of a sign language mail communication apparatus according to an embodiment of the present invention.

FIG. 1 is a block diagram showing the construction of a sign language information mail communication apparatus according to an embodiment of the present invention. This mail communication apparatus also operates as an information processing apparatus capable of processing sign language information. In FIG. 1, reference numeral 101 denotes a CPU for performing a processing in accordance with a started program, numeral 102 a main memory for storing data or the like, numeral 103 a network manager for making the management/control of network information though a telephone line or the like, numeral 104 an information display unit for providing the visual representation of information, numeral 105 a display controller for controlling the contents of display for the display unit 104, numeral 106 an acoustic output controller for controlling the volume of acoustic information such as sound or speech, numeral 107 an acoustic output unit such as a speaker for outputting sound or speech, and numeral 108 a microphone used for speech input. Programs to be executed and data to be accessed are read from an auxiliary memory 109 such as a disk to the main memory 102, as required, so that a data processing based on the present embodiment is performed by the CPU 101.

In the disk 109 are stored a system program 110 for controlling the whole of the system, a sign language mail management program 111 for sending/receiving a sign language mail prepared by a user, a sign language to natural language translation program 112 for translating sign language word information inputted to the apparatus or sign language gesture information displayed as an animation into a text of a natural language, a sign language generation program 113 for generating a sign language animation from a text of a natural language inputted into the apparatus by a user, an output content control program 114 for changing the content of an output from the apparatus in accordance with a user's request, a speech input/output program 115 for inputting/outputting speech information, a non-language information extraction program 116 for extracting non-language information included in input information, a speech information analysis program 117 for analyzing speech information inputted to the apparatus, a speech synthesis program 118 for generating a synthetic speech from phonemes, an image display program 119 for displaying sign language gesture information, text information or the like, and a text input program 120 for inputting a text to the apparatus. The disk 109 is further stored with a database including natural language word to sign language word label correspondence data 121 in which a relationship or correspondence between natural language words and sign language words is described, non-language information correspondence data 122 in which a rule for representing non-language information by a sign language, a speech or the like is described, sound source data 123 which is a set of phonemes for generating a synthetic speech, speech recognition data 124 which is necessary for analyzing an inputted speech, an input information recognition/analysis result storage table 125 which is stored as a result of recognition or analysis of input information, and a morphological analysis dictionary 126.

Now, the operation of the present apparatus as a mail communication apparatus will be described in reference to process flow charts shown in FIGS. 11 to 18.

Figure 2:
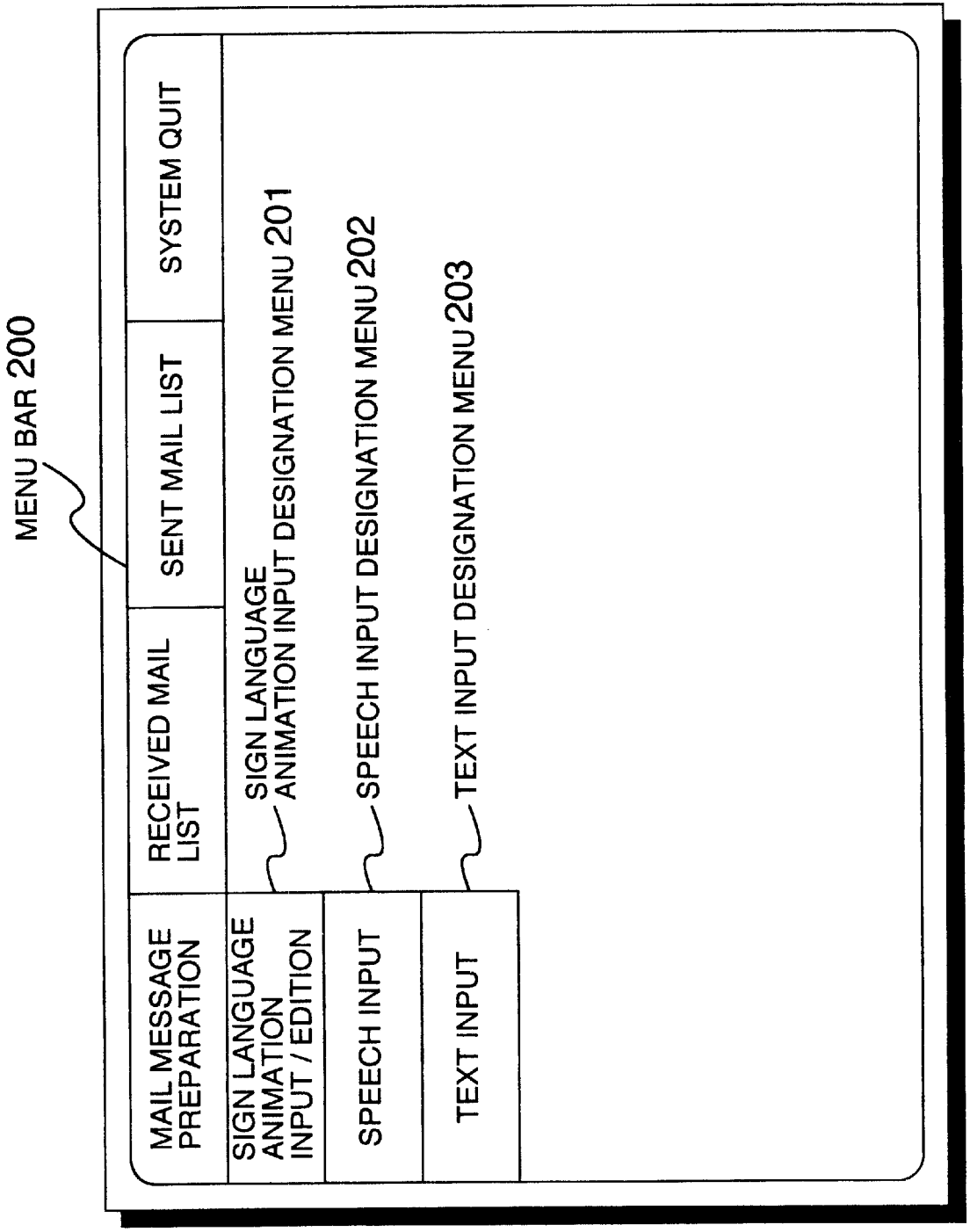
FIG. 2 is a diagram showing an example of a display screen in the embodiment.

First, a user starts a system program 110 (step S1101). Further, the user starts a sign language mail management program 111 (step S1102), thereby starting a text input program 120 (step S1103) and a speech input/output program 115 (step S1104). The speech input/output program 115 is composed of a speech input program and a speech output program. In this case, the speech input program is started. Further, an image display program 119 is started to display a screen for information input/output (step S1105). An example of the information input/output screen is shown in FIG. 2.

Preparation of a mail will now be described. There are prepared three ways of mail preparation, that is, a first method in which a mail is prepared by use of an animation generated using a sign language animation editing function, a second method in which a mail is prepared by use of speech input, and a third method in which a mail is prepared by use of text input.

Figure 3:
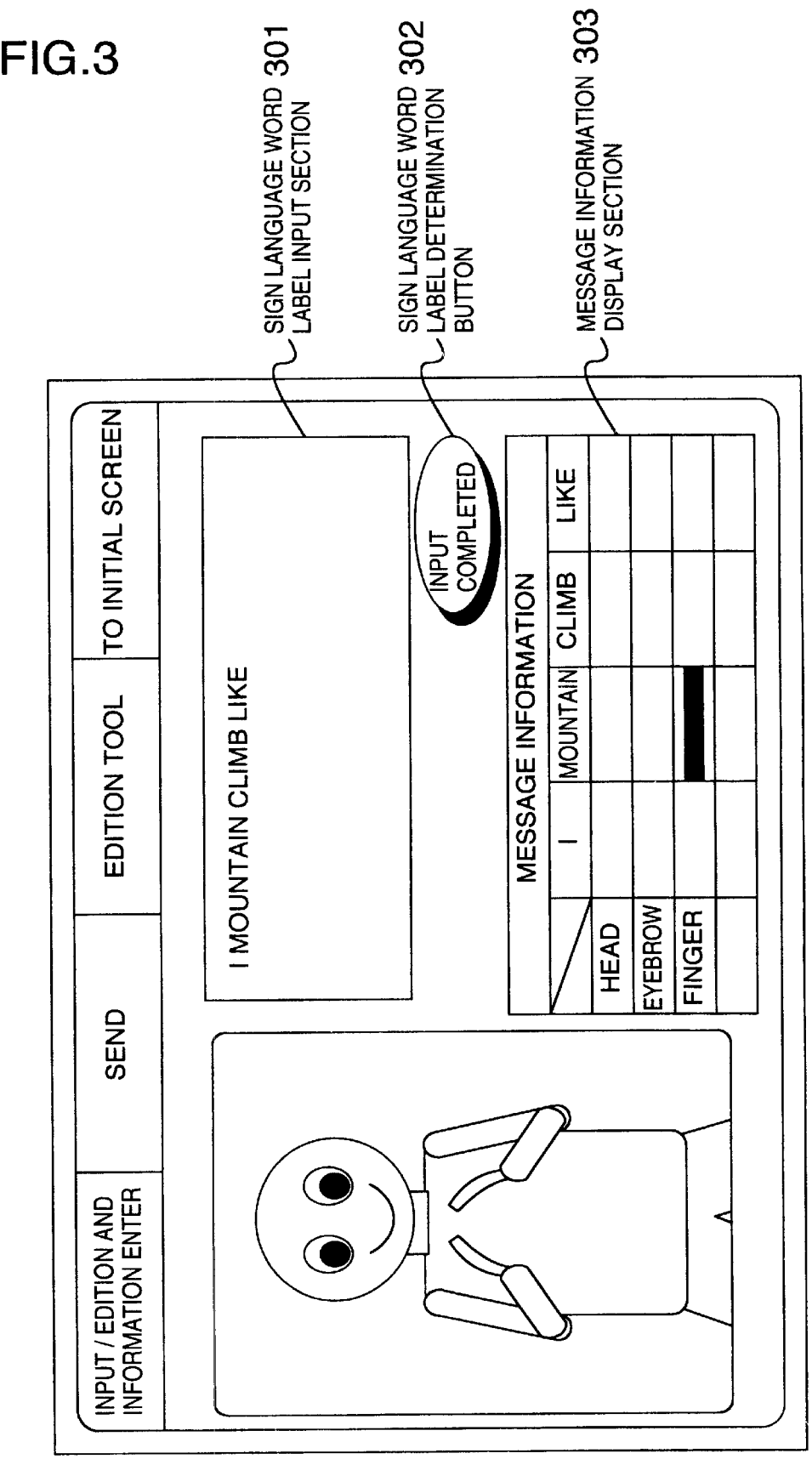
FIG. 3 is a diagram showing an example of a display screen for sign language animation editing input in the embodiment.
Figure 12:
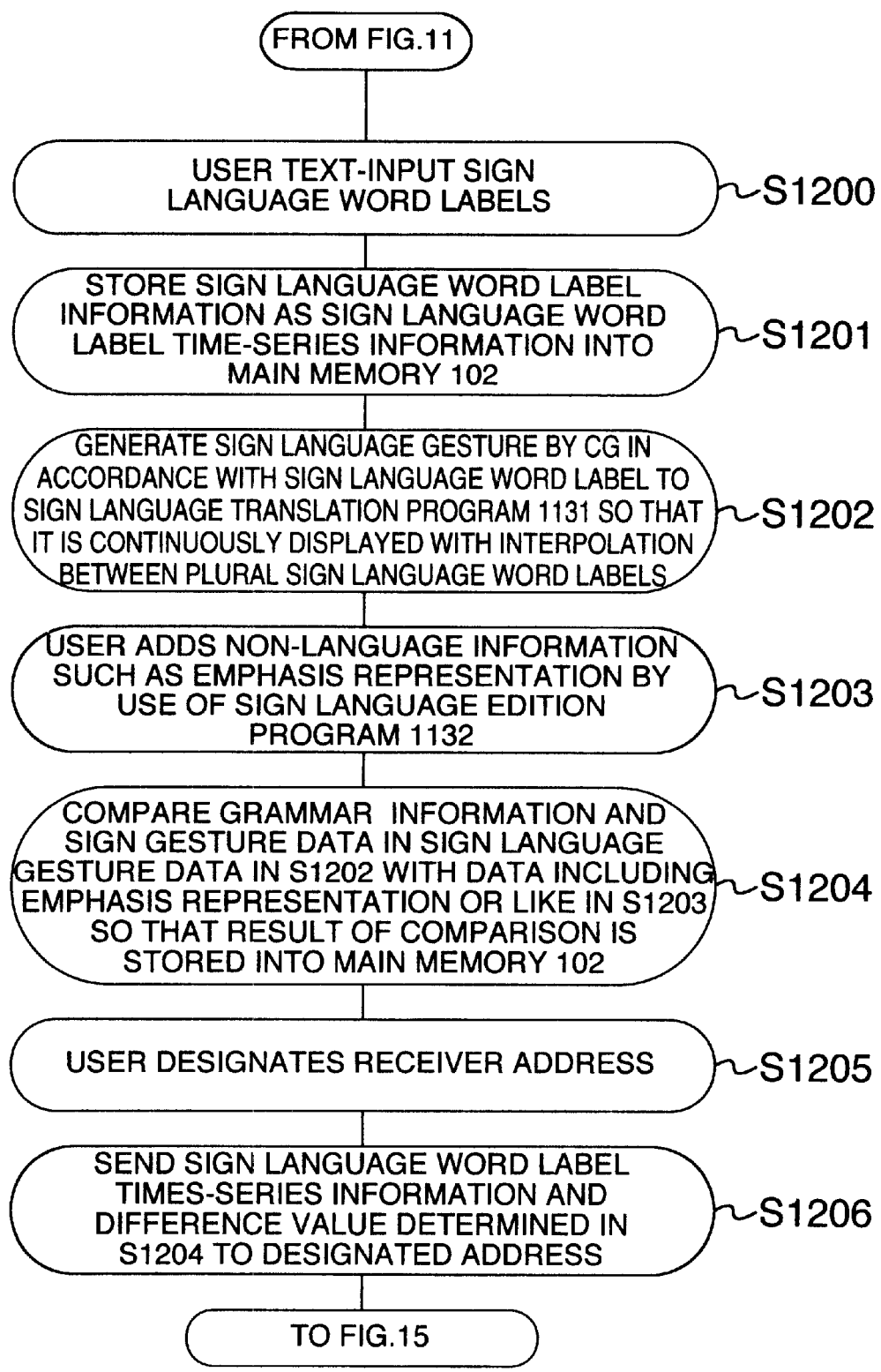
FIG. 12 is a flow chart of a mail sending processing with sign language input according to an embodiment of the present invention.
Figure 13:
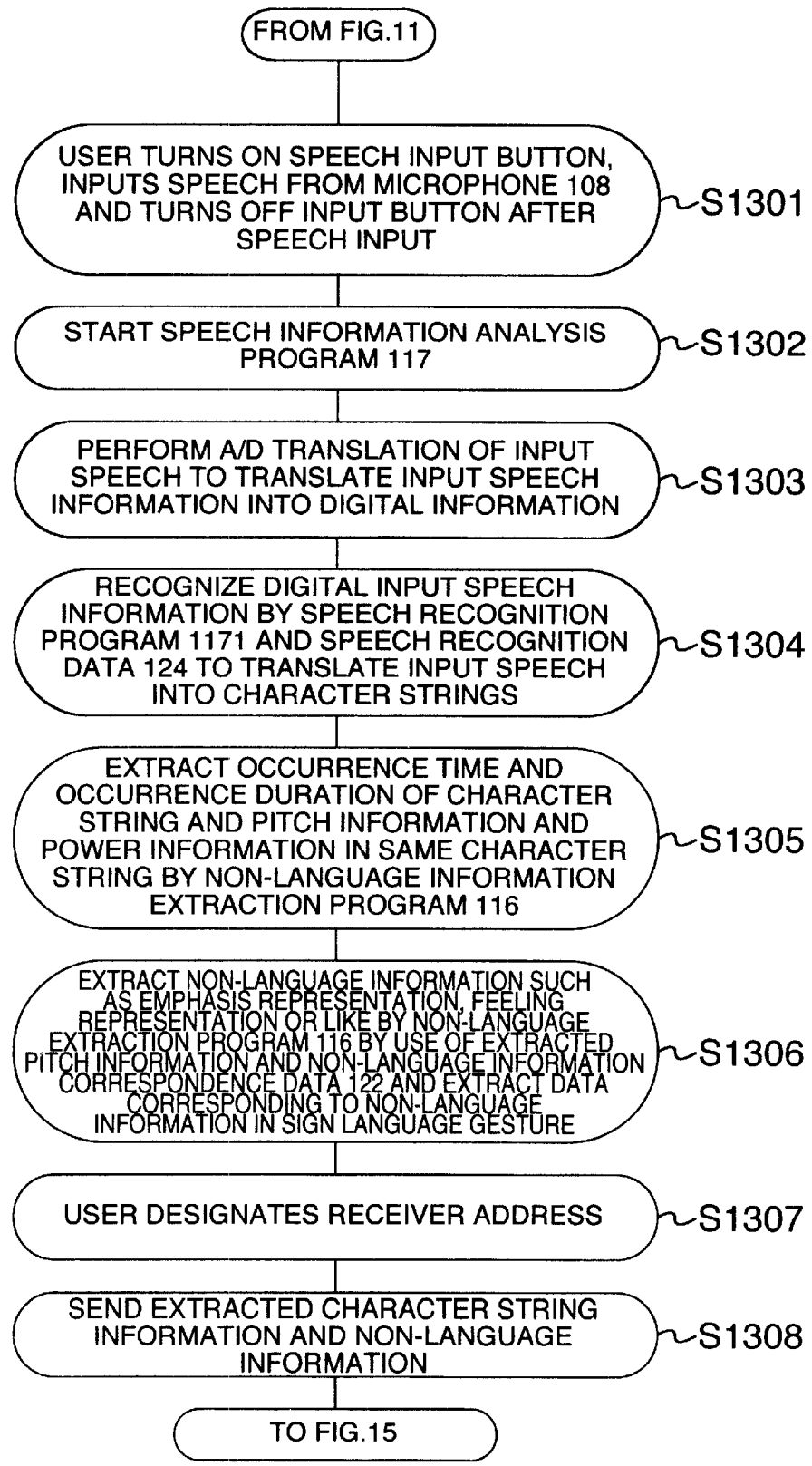
FIG. 13 is a flow chart of a mail sending processing with speech input according to an embodiment of the present invention.
Figure 14:
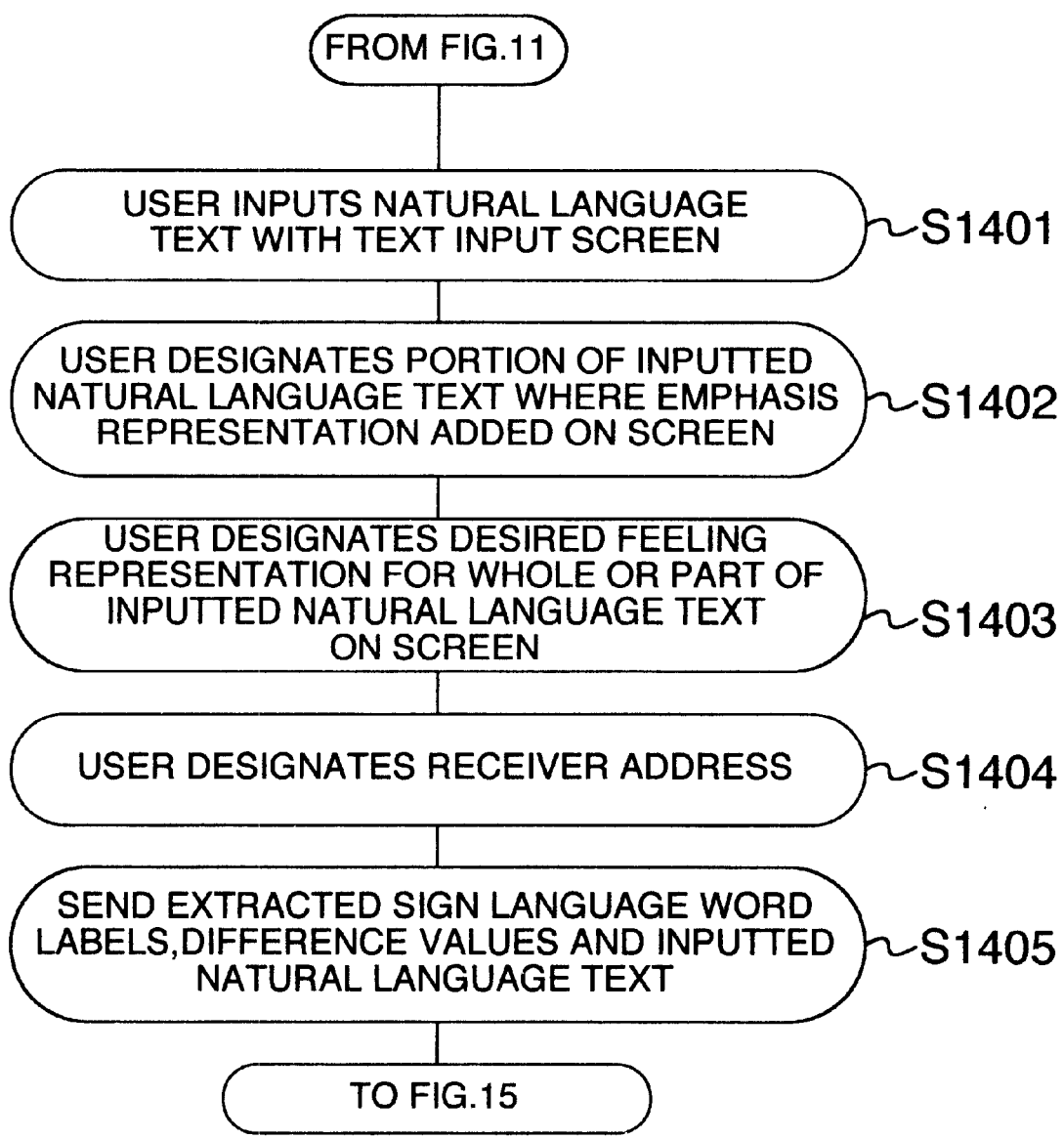
FIG. 14 is a flow chart of a mail sending processing with text input according to an embodiment of the present invention.

First, the mail preparation using the sign language animation editing function will be described in reference to FIG. 12. For example, when "MAIL PREPARATION" is selected from a menu bar 200 shown in FIG. 2 and a sign language animation input designation menu 201 represented as "SIGN LANGUAGE ANIMATION INPUT/EDITING" is selected, there is provided a screen for sign language animation editing, as shown in FIG. 3, on which sign language word labels for defining a sign language animation and editing items for specifying manual signs or sign gestures corresponding to the respective sign language word labels are displayed. The user inputs sign language word labels into a sign language word label input section 301 (step S1200). In the shown example, a sign language word label string of "I MOUNTAIN CLIMB LIKE" (corresponding to "WATASHI YAMA NOBORU SUKI" in Japanese) is inputted.

When a sign language word label determination button 302 represented as "INPUT COMPLETED" is turned on after the input of the sign language word label string, the sign language word labels are stored as time-series information with the form of a structure of Ling_h [i] [j]

(i=the order number of occurrence of sign language word labels, j=the number of characters)

into the main memory 102 (step S1201).

Figure 4:
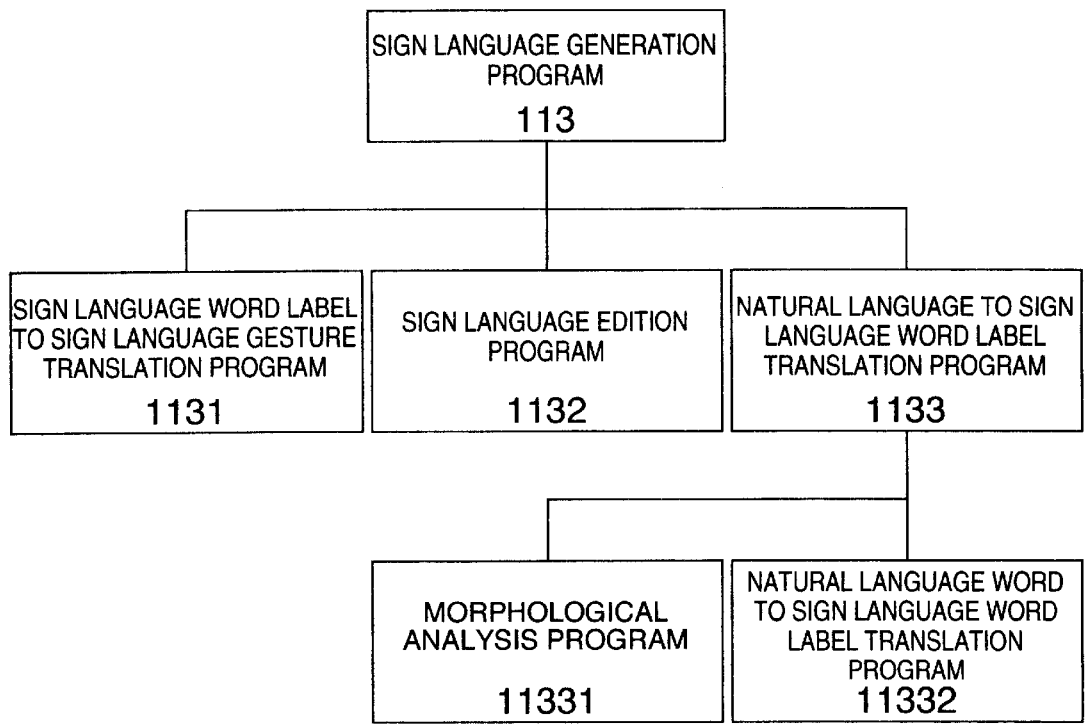
FIG. 4 is a block diagram showing an example of the construction of a sign language generation program 113 shown in FIG. 1.

Hereupon, a sign language generation program 113 is started. The sign language generation program 113 is composed of a sign language word label to sign language gesture translation program 1131, a sign language editing program 1132 and a natural language to sign language word label translation program 1133, as shown in FIG. 4. First, with the sign language word label to sign language gesture translation program 1131, sign language animation data corresponding to each sign language word label is extracted from natural language word to sign language word label correspondence data 121 (FIG. 1).

An example of the structure of the natural language word to sign language word label correspondence data 121 is shown in FIG. 5. An area 400 is described with an entry number of a sign language word, and an area 401 is entered with a natural language word. A sign language word label corresponding to the natural language word is stored in an area 402, and a part of speech corresponding to each language word is stored in an area 403. Further, sign gesture data for displaying each sign language word label as an animation is stored in an area 404. The sign gesture data includes position data corresponding to a time in a lapse time area 4041, for example, position information stored in an elbow gesture data area 40421 of a right hand area 4042 and represented in the form of three dimensions including X, Y and Z axes. Also, a flag of "A" in an area 4043 describes a repose point at which the gesture takes a repose in each language word. A flag of "A" in an area 4044 describes a direction change point at which a vector representing the direction of the gesture has a change in direction.

More particularly, for example, as original display data for the sign language animation data generated or extracted through the above-mentioned technique, there is generated an original data structure of org f_[i] [s0] [axis]

(i=the order number of occurrence of words, s0=a frame number in a word, axis=axis (x=0, Y=1, Z=2)).

Further, a structure composed of

[data_n]: entry number 400 in the correspondence data 121,

[part]: general classification 4042 of gesture axis point,

[sub_part]: sub-classification 40421 of gesture axis point, and

[perm]: coordinate value is generated as a sub-structure for the original data structure. The original display data thus generated is stored into the main memory 102.

Then, the sign language word label to sign language gesture information translation program 1131 having a function similar to that of, for example, the sign language editing system "Mimehand" manufactured by Hitachi, Ltd. uses the above-mentioned original display data stored in the same row (or same hierarchic sequence) as the sign language word labels so that the manual signs, feelings or the like of a CG (computer graphics) character displayed on the screen are displayed in the form of an animation through the display controller 105 and the information display unit 104 (step S1202).

Figure 6:
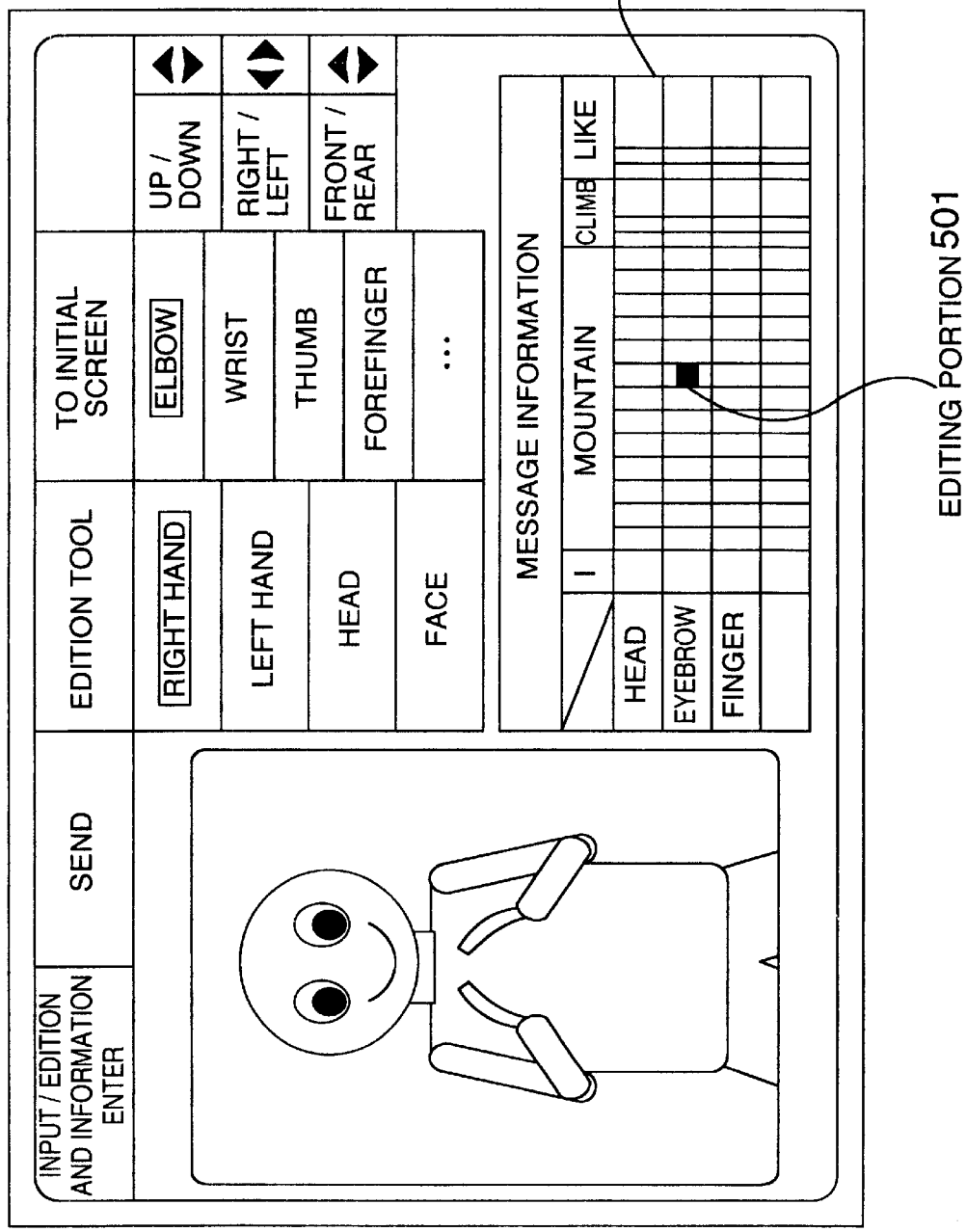
FIG. 6 is a diagram showing an example of a display screen for sign language mail editing the embodiment.

Hereupon, the user starts the sign language editing program 1132 (FIG. 4) for editing which includes the addition of non-language information such as emphasis representation and/or feeling representation to the displayed animation information (step S1203). FIG. 6 shows a screen which may be obtained by pulling down main menus on the screen shown in FIG. 3. In the display screen (or screen for editing) as shown in FIG. 6 having the original animation display data displayed thereon, the user first selects that frame from a menu portion or message information display section 303 displayed at the right and lower part of FIG. 6 for which a change in sign language animation is to be made. Next, an "EDITING TOOL" menu is selected. Then, for example, in the case where the right hand is to be made an object of editing, "RIGHT HAND" is selected. Further, "ELBOW" is selected and scroll buttons at the side of "UP/DOWN", "RIGHT/LEFT" and "FRONT/REAR" are thereafter operated. Thereby, the position of "ELBOW" in the selected frame is changed in accordance with the amount of scroll.

The above operation is performed for each frame for which the editing is desired. For each frame, a change data structure of Change_f [I_1] [s1] [axis]

is generated as position information after change. Further, a sub-structure having constituent elements including

[part]: part=general classification of gesture portion,

[sub_part]: sub-classification of gesture portion,

[perm]: coordinate value, and

[data_n1]: entry number in the above-mentioned correspondence data 121 is generated for the change data structure. The edited data or the change data structure thus generated is stored as an after-change data structure into the main memory 102.

Figure 7:
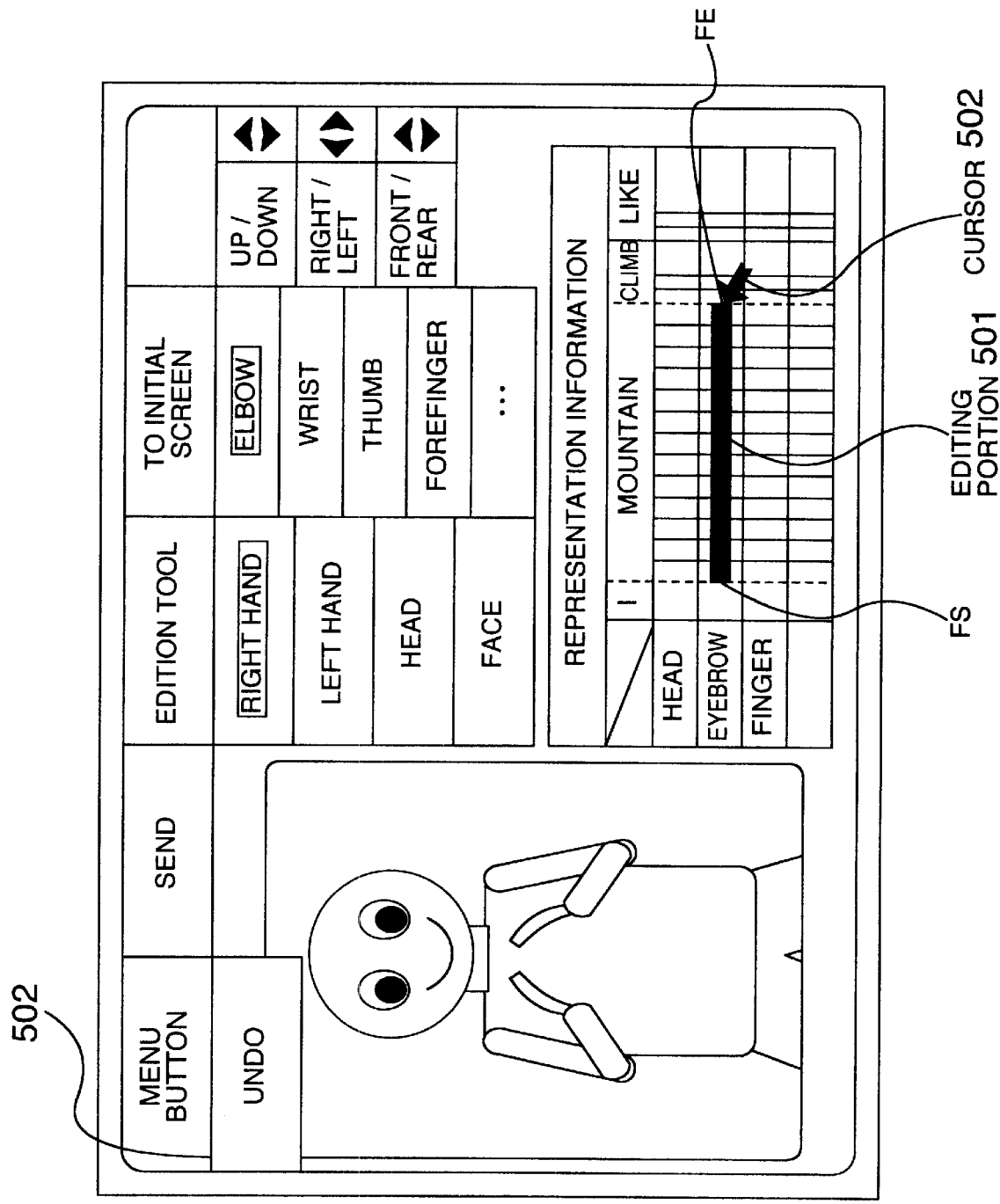
FIG. 7 is a diagram showing another example of the display screen for sign language mail editing in the embodiment.

In the case where it is desired to elongate the duration of a sign gesture, a starting point FS and an end point FE of a portion made an object of editing are set, for example, by use of a mouse operating a cursor 502, as shown in FIG. 7 and the starting and end points are dragged, thereby performing an operation of elongating or shortening the overall duration. When the duration is elongated in the above operation, the sign language editing program 1132 (FIG. 4) performs, for example, the operation of linear interpolation in which frames are equally inserted in compliance with the elongated duration. When the duration is shortened, there is performed the operation of linear interpolation in which frames are equally trimmed from the editing portion. In this case, the data is stored into the main memory 102 with the frame number s1 of Change_f inserted or deleted.

The foregoing operation results in that modified sign language animation information data is stored into the main memory 102.

After the completion of editing, a non-language information extraction program 116 is started to extract non-language information from input information (or the modified sign language animation information data) by use of non-language information correspondence data 122 and the natural language word to sign language word label correspondence data 121 (step S1204).

Herein, the extraction of emphasis representation is made by way of example. One feature of emphasis representation in a sign language may include a change in the order of words. Accordingly, there may be the case where non-language information (or emphasis representation) has already been included in the sign language word label string inputted in step S1200. In the shown example, such a change in word order and changes in the locus and duration of a sign gesture are handled as the characteristics (or feature quantities) of emphasis representation.

First, the comparison is made for the order of words in the inputted sign language word label string. An example of the structure of non-language information correspondence data 122 (FIG. 1) is shown in FIG. 8. Therein, the mutual reference to non-language data stored in a sign language data portion, a speech data portion and a text data portion can be made on the basis of a symbol number.

FIG. 9 shows an example of the structure of the sign language data portion. The sign language data portion is composed of a symbol number 901 indicating the type of non-language information such as emphasis information or feeling information (inclusive of plural feeling representations), a comparison object 902 made a comparison function in extracting a symbol, a characteristics for comparison model 903 specific to the comparison item, and a basic non-language information model 904. The speech data portion shown in FIG. 8 has a structure as shown in FIG. 10.

In the following, the extraction of emphasis representation will be described by way of example. As one of comparison object items for the extraction of emphasis representation is stored grammar information which indicates the order of words in the case where emphasis representation is involved. The order of words in the inputted sign language word label string is compared with the grammar information. The order of words in the input sign language word label string stored in the form of Ling_h [i] in the main memory 102 is determined on the basis of the description contents of those part-of-speech areas 403 (FIG. 5) of the natural language word to sign language word label correspondence data 121 which are stored in the same rows as respective label data of the input sign language word label string. For example, in the case where the sign language word labels are inputted or stored as the data structure form of Ling_h [i] in the order of "I", "CLIMB" and "MOUNTAIN", the part-of-speech information obtained from the data 121 suggests a syntax of S-V-O.

That is, an SVO syntax is extracted as a characteristics for comparison model on the basis of the part-of-speech information. Next, the collation is made with an emphasis syntax pattern SVO (model SVO in the non-language information model 904 shown in FIG. 9) stored in the non-language information correspondence data 122 (FIG. 8). In the case where the matching is obtained, Ling_h [i] is stored as an emphasis data structure conv_v1 into the main memory 102. In this case, "MOUNTAIN" corresponding to "O" is stored.

Secondly, the extraction or detection of emphasis representation is made on the basis of a difference value between a declaratory gesture and a gesture involving emphasis or feelings therein. The difference value is determined with respect to the magnitude of a gesture (for example, the change of position information described above in reference to FIG. 6) and the duration of a representation (for example, the elongation of a sign gesture duration described above in reference to FIG. 7). As to gesture data for each sign language word label, a difference value between a declaratory gesture value (value for the characteristics for comparison model 903 shown in FIG. 9) of org_f [i] [s0] [axis]

and a value of

Change_f [i_1] [s] [axis]

in the inputted sign language animation data is introduced into the characteristics for comparison model 903 of the non-language information correspondence data 122. In the case where a word matching with the model is detected, that word is stored as an emphasis data structure Non-V1 into the main memory 102 in a manner similar to that in the above-mentioned case of grammar information. The outline of examples of the characteristics for comparison model will now be described.

(1) Word Duration Model (1-1) The determination of a duration change rate in each word:

word_def [i]=(s−s0)(s−s0)/s0

(i=word occurrence order number).

(1-2) The detection of that one (def_leg) of words in a sentence or text which has the most duration change rate:

def_lg=0;
for (j=0; j<i; j++) {if (word_def [j+1]–word_def [j]>0)
{(def_lg=j+1;)}.

(2) Coordinate Value Change Amount Model (2-1) The detection of a repose point and the detection of a vector value between frames:

A Euclidean distance between frames is determined from coordinate values. The distance between frames is represented by length [time] [def]

Next, in the case where the distance of length [time] [def] is smaller than a certain value, it is determined that there is no movement between the frames. There is regarded as being a repose inter-frame length. For example, in the case where the repose inter-frame length is detected over three or more frames, a group of corresponding repose inter-frame lengths are regarded as repose points so that "1" is introduced as a flag indicative of a repose point into length [time] [point_sc].

In the case where the inter-frame distance does not correspond to a repose point, "0" is set. Also, in the case where a direction vector value between given frames has a significant difference as compared with that between frames preceding the given frames and that between frames succeeding the given frames, a contact point of two direction vectors having the significant difference therebetween is entered as a direction change coordinate value into Vector [number_v] [position_v]

(number_v=change point number, position_v=1 (change point frame number)).

(2-2) The determination of a repose point stay duration, an acceleration value between repose points and an acceleration value between direction change points:

In the case where a certain number of repose point flags or more than that continuously exist, a group of corresponding repose points are entered as a repose point stay frame group into a data structure of st_dur [number] [position]

(number=repose point group number, position=0 (start point frame), 1 (end point frame), 2 (repose point stay time)

which indicates a repose point group frame position. Also, an acceleration value in the frame group extending from a beginning point of the repose point group to an end point thereof and an acceleration value between direction change points are determined and are stored into st_dur [number] [3] and [4], respectively. For the direction change point, the acceleration value between the change points is introduced into Vector [number_v] [2].

(2-3) Comparison between a standard value and an actual gesture value:

A repose point stay duration value of the repose point group 4043 entered in the natural language word to sign language word label correspondence data 121 and acceleration values between repose points and between the direction change points 4044 are compared with actual values corresponding thereto in representation position, that is, the corresponding repose point stay duration and acceleration values determined in the above (2-2). In the case where a ratio between the stay durations is equal to or larger than a certain value conf_i and in the case where a ratio between the acceleration values is equal to or larger than a certain value conf_j and a significant difference exists in the comparison between words with respect to both the value of conf_i and the value of conf_j, the corresponding word having the significant difference is stored as a word with emphasis representation into the main memory 102 in the form of a data structure of Non-V1 together with a symbol number.

Hereupon, an address of a receiver is designated (step S1205), and the sign language word label string Ling_h [i] [j] and the emphasis representation information Non-V1 are mail-transmitted in accordance with the sign language mail management program 111 (step S1206).

Next, the description will be made of the case where a user inputs a speech to prepare mail. The reference will be made to FIG. 13. "MAIL PREPARATION" is selected from the menu bar 200 shown in FIG. 2 and a speech input designation menu 202 represented as "SPEECH INPUT" is selected, so that the user inputs a speech by use of the microphone 108 (FIG. 1) (step S1301). Non-language information such as emphasis information and/or feeling information is included in the inputted speech, as required. Then, a speech information analysis program 117 is started (step S1302). The contents of input are A/D-translated by the speech input program included in the speech input/output program 115 (step S1303) so that digital speech data is stored as a speech waveform data structure TN into the main memory 102.

By the speech information analysis program 117, the stored speech waveform is subjected to pitch extraction and duration extraction and is further subjected to a speech recognition processing. In the speech recognition processing, speech recognition using a speech recognition technique disclosed by, for example, S. Furui, "DIGITAL SPEECH PROCESSING", Tokai University Publishing Section, (1985), pp. 177–185 is performed by use of speech recognition data 124 having phoneme models stored therein, so that the input speech information is translated into character strings (step S1304).

Hereupon, the non-language information extraction program 116 is started so that the character strings are stored into speech recognition result cells of an input information recognition/analysis result storage table 125 (FIG. 1). Further, pitch information (or fundamental frequency) is extracted, for example, every 20 msec and is stored in the data structure form of an array P [m][n][q] (P[0][0][0], P[0][0][1], ... P[m][n][q])

(m=character string number, n=number of frames, q=order number of pitch storage for every 20 msec)

into the recognition/analysis result storage table 125.

Further, the vocalization beginning time, vocalization ending time and vocalization duration of each character string as the result of speech recognition and the duration of each vocal sound in that character string are determined from the array P and are stored in the form of a data structure of Length [m] [data] (Length [0], . . . Length [m])

(m=character string number, and data=0 (vocalization duration), 1 (vocalization beginning time), 2 (vocalization ending time), 3 (vocal sound duration))

into the main memory 102 (step S1305). The data=3 (vocal sound duration) is stored with an array ensured corresponding to the number of vocal sounds.

Using the pitch information P, the vocalization duration Length, and a basic speech non-language information model 1004 (FIG. 10) included in the non-language information correspondence data 122 (FIG. 1), the non-language information extraction program 116 judges whether or not non-language information is included in the inputted speech information (step S1306). As the basic speech non-language information model are represented, for example, the standard vocalization duration of a word, the standard duration of silence between adjacent words, and the standard value of pitch gradient at the beginning point of a word.

If a ratio between the standard vocalization duration, silence duration and/or beginning pitch gradient and an actually measured or determined value is equal to or larger than a certain fixed value, a word immediately succeeding the silence duration is entered as an emphasis representation word in the form of a data structure of conv_V1 together with a symbol number. Also, with respect to the vocal sound duration of each word, if there is a word for which a difference value of (actual value) minus (value corresponding to non-language information correspondence data) has an increasing tendency in a direction from a first vocal sound of that word to the last vocal sound thereof, a word immediately succeeding that word is entered as an emphasis representation word in the form of a data structure of conv_V1.

In the case where it is determined as the result of comparison with the speech non-language information model in step S1306 that non-language information is included, a flag indicative of non-language information is stored as conv_V1 into the main memory 102. Hereupon, the user designates a receiver (step S1307) and sends the character string information obtained in step 1304 and the non-language information flag (step S1308).

Figure 19:
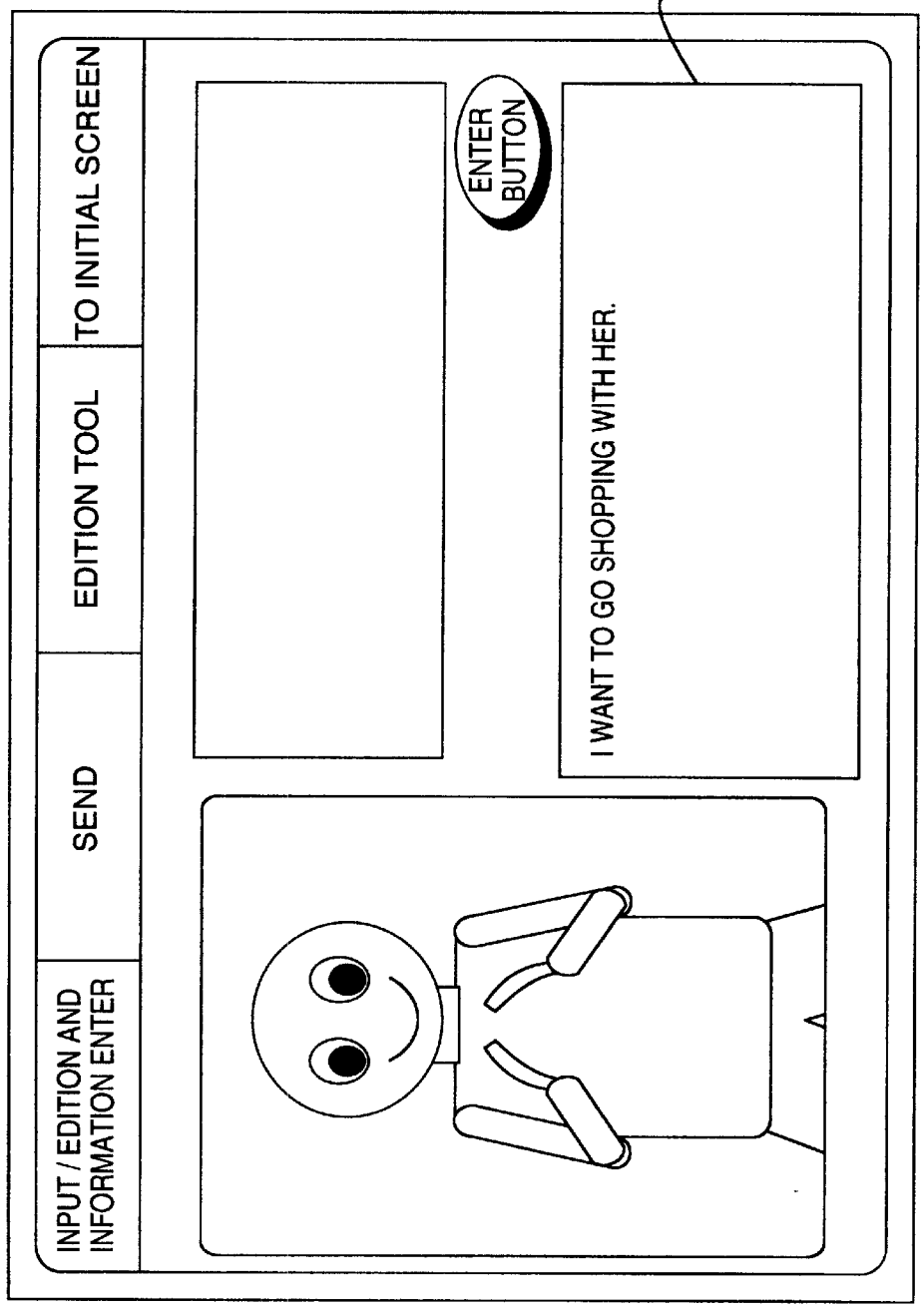
FIG. 19 is a diagram showing an example of a display screen for text input shown in FIG. 14.

Next, the description will be made of the case where a user inputs a text to prepare a mail. The reference will be made to FIG. 14. "MAIL PREPARATION" is selected from the menu bar 200 shown in FIG. 2 and a text input designation menu 203 represented as "TEXT INPUT" is selected, so that the user inputs a text or character strings into a text input section 191, as shown in FIG. 19 (step S1401). In the case where the user desires to add emphasis representation, feeling representation or the like the user performs, for example, a processing for underlining a portion to be subjected to emphasis representation (step S1402) and adding a face mark to a portion to be subjected to feeling representation (step S1403). A word (or words) underlined is(are) stored as emphasis representation or non-language information flag in the form of a data structure of conv V1 into the main memory 102. After designating a receiver (step S1404), the user sends the inputted character string information and the non-language information flag (step S1405).

Figure 15:
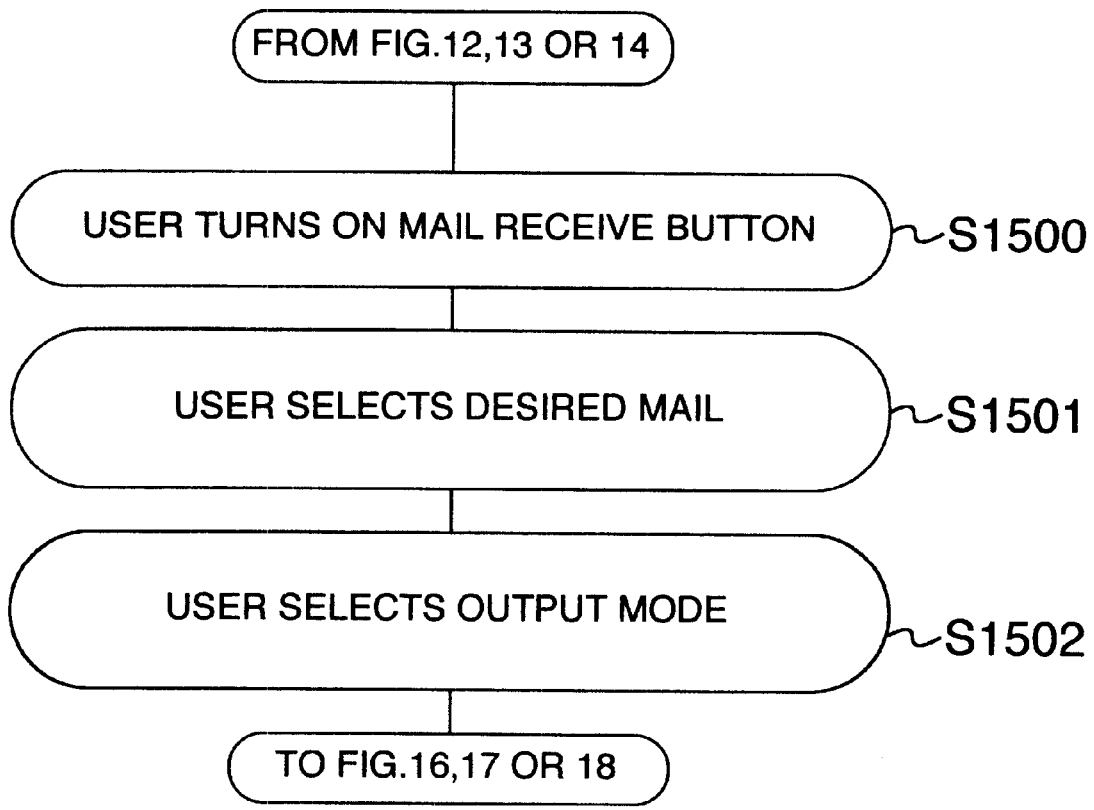
FIG. 15 is a flow chart of a processing performed prior to mail reception in an embodiment of the present invention.

Next, a method of outputting information on the receiver side will be described in reference to FIG. 15. A possible method for output of a received mail includes the output in a sign language animation form, the output in a text form and the output in a speech form. Prior to the output of a received mail, a user performs the following processing. For example, the user turns on a mail receive button to load mails down from a server (step S1500), selects a desired mail from a received mail headline on a display screen (step S1501) and selects an output (or display) mode (step S1502).

Figure 16:
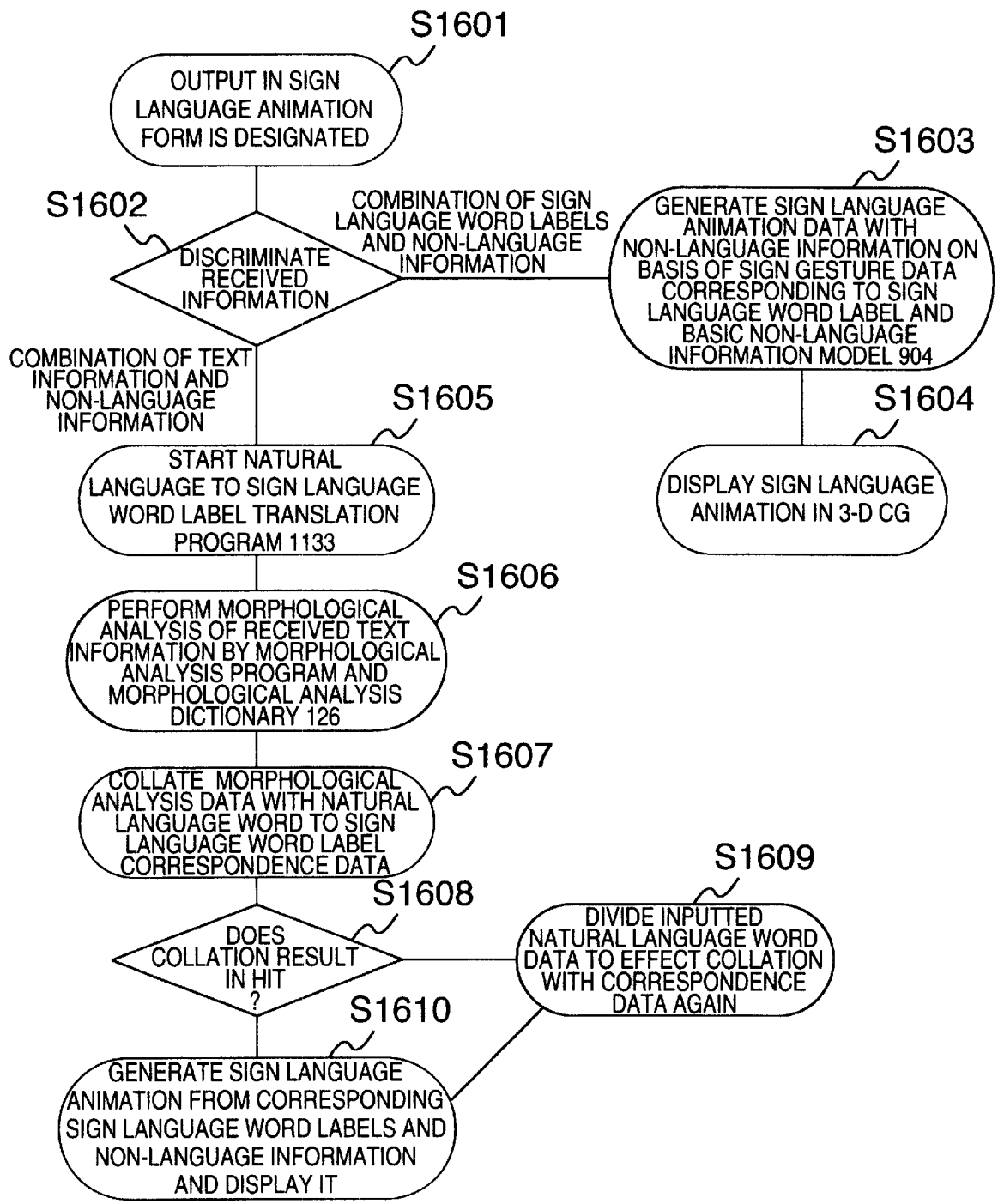
FIG. 16 is a flow chart of a mail reception processing with sign language animation output according to an embodiment of the present invention.

First, an output processing performed in the case where a sign language animation form is selected as the output mode (step S1601), will be described in reference to FIG. 16. Received information is discriminated to judge whether it is the combination of a sign language word label string and non-language information or the combination of a natural language text and non-language information (step S1602). When the received information is a combination of a sign language word label string (which is in a two-dimensional arrangement of characters) and non-language information, the sign language word label to sign language gesture translation program 1131 (FIG. 4) is started so that sign gesture data 404 (FIG. 5) for each word in the natural language word to sign language word label correspondence data 121 (FIG. 5) corresponding to the received sign language word label is introduced into the basic non-language information model 904 (FIG. 9) in the sign language data portion of the non-language information correspondence data 122, thereby generating sign language animation data with non-language information added thereto (step S1603) and outputting or displaying a sign language animation in three-dimensional computer graphics (3D-CG) onto a display screen on the basis of the generated data (step S1604).

On the other hand, when the received information is a combination of text information (which is in a one-dimensional arrangement of characters) as a result of speech recognition and non-language information or a combination of text information (which is in a one-dimensional arrangement of characters) and non-language information, the natural language to sign language word label translation program 1133 (FIG. 4) is started (step S1605). As shown in FIG. 4, the natural language to sign language word label translation program 1133 is composed of a morphological analysis program 11331 and a natural language word to sign language word label translation program 11332.

First, the morphological analysis program 11331 and a morphological analysis dictionary 126 (FIG. 1) are used to divide the received text information into words through a morphological analysis technique disclosed by, for example, Hirofumi Sakurai and Toru Hisamitsu, "Design and Evaluation of Japanese Morphological Analyzer ANIMA", Transactions of the 54-th Nation-wide Meeting of Information Processing Society of Japan in former half of 1997, so that information including the parts of speech and conjugations of the words is stored as a word information data structure of Word_info [i] [j]

(i=word occurrence order number, j=type of information (1=word notation, 2=end-form notation, 3=part of speech, 4=tense, 5=reading or pronunciation, . . . ))

into the main memory 102 (step S1606).

Further, the natural language word to sign language word label translation program 11332 (FIG. 4) is used to collate the natural language word data 401 in the natural language word to sign language word label correspondence data 121 with the end-form notation information of the data structure of Word_info [i] [2] and to collate the part-of-speech information 403 in the data 121 with the part-of-speech information of Word_info [i] [3] (step S1607). In the case where the collation concerning both the end-form notation and the part of speech results in a hit (step S1608), the corresponding sign language word label is stored in a data structure form of Word_info [i] [j+1] into the main memory 102.

In the case where the collation results in a mishit (step S1608), Word_info [i] [2] is further divided to collate the resultant plural words with the natural language word data 401 in the natural language word to sign language word label correspondence data 121 (step S1609). In the case where it is possible to constitute Word_info [i] [2] by the natural language word data, the plural-word data of the natural language word subjected to division is stored in the form of a data structure of Word info [i] [j+1] into the main memory 102.

Further, the following change is made in conjunction with the non-language information included in the received text. For example, a change in order of words in an emphasis portion of the text is made. In the case where the emphasis portion corresponds to the basic non-language information model 904 for "GRAMMAR INFORMATION" in the sign language data portion (FIG. 9) of the non-language information correspondence data 122, the occurrence order number [i] of Word_info [i] [j+1] is changed in accordance with a syntax model described in the corresponding basic non-language information model.

Also, in the case where gesture representation information as emphasis information (in the form of a text or numerical values) is included in the received information, the following is made in conjunction with the emphasis portion by the output content control program 114. Namely, an animation emphasis model (basic non-language information model 904 in the sign gesture data portion FIG. 9) of the non-language information correspondence data 122 is used so that the sign gesture data 404 (FIG. 5) in the natural language word to sign language word label correspondence data 121 described in the same row as a word designated as an emphasis portion in the main memory 102 is changed to add emphasis representation. Similarly, in conjunction with feeling representation, the sign gesture data 404 is changed using a feeling representation model in the non-language information correspondence data 122. Finally, the changed sign language word label string and the changed sign gesture data are used to generate modified sign language animation data so that a sign language animation is three-dimensionally (3D) displayed on a sign gesture output screen as shown in FIG. 3 (step S1610).

Figure 17:
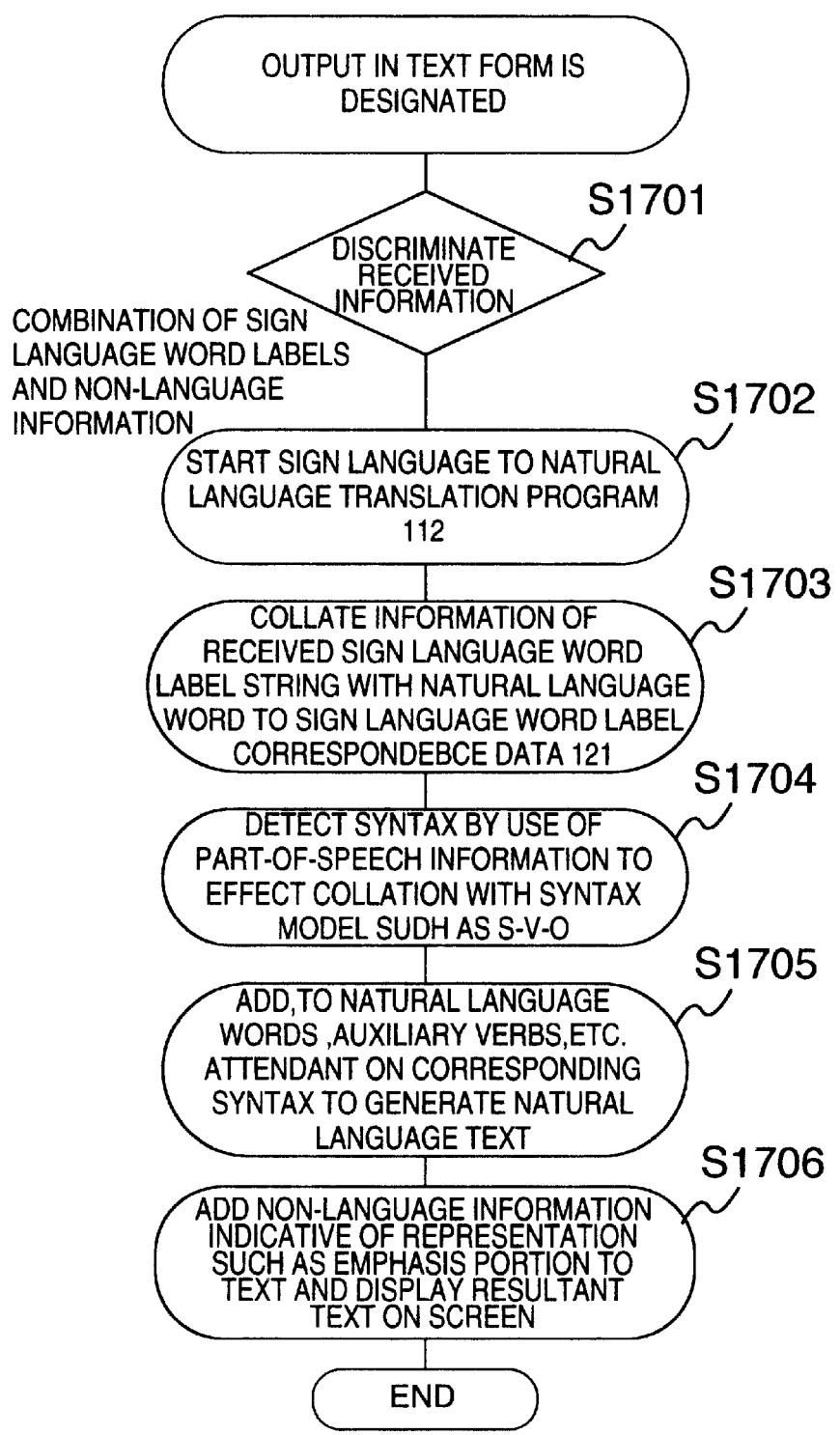
FIG. 17 is a flow chart of a mail reception processing with text output according to an embodiment of the present invention.

Next, an output processing performed in the case where a user selects a text form as the output mode, will be described in reference to FIG. 17. Similarly to the case shown in FIG. 16, received information is discriminated (step S1701). In the case where the received information is the combination of a sign language word label string and non-language information, a sign language to natural language translation program 112 (FIG. 1) is started (step S1702) so that information of the sign language word label string received as a mail is collated with the natural language word to sign language word label correspondence data 121 (FIG. 5) (step S1703) to search for a natural language word which corresponds to each received sign language word label.

A string of natural language (for example, English) words obtained as the result of search is collated with a syntax model such as S-O-V by use of part-of-speech information of the corresponding words in the data 121 (step S1704). In the case where a syntax model matching with the word string or having no contradiction thereto is detected, attached words (corresponding to "kakujoshi" in Japanese) or particles (corresponding to "joshi" in Japanese), auxiliary verbs and so forth attendant on the syntax model are coupled with words in the word string. The resultant word string text is stored as a data structure of Word_box [m] (m=word occurrence order number) into the main memory 102 (step S1705).

Further, non-language information (such as information indicative of an emphasis portion) in the received data is added into the text by use of the basic non-language information model (step S1706). For example, a face mark may be added to a word corresponding to the emphasis portion is underlined or a feeling information added portion. In the case where the combination of character strings as the result of speech recognition and non-language information is received, for the non-language information to be added to the recognized text information, a word in an emphasis portion is underlined or a face mark is added to a feeling information added portion. The similar process is also performed in the case where the combination of text information and non-language information is received.

Figure 18:
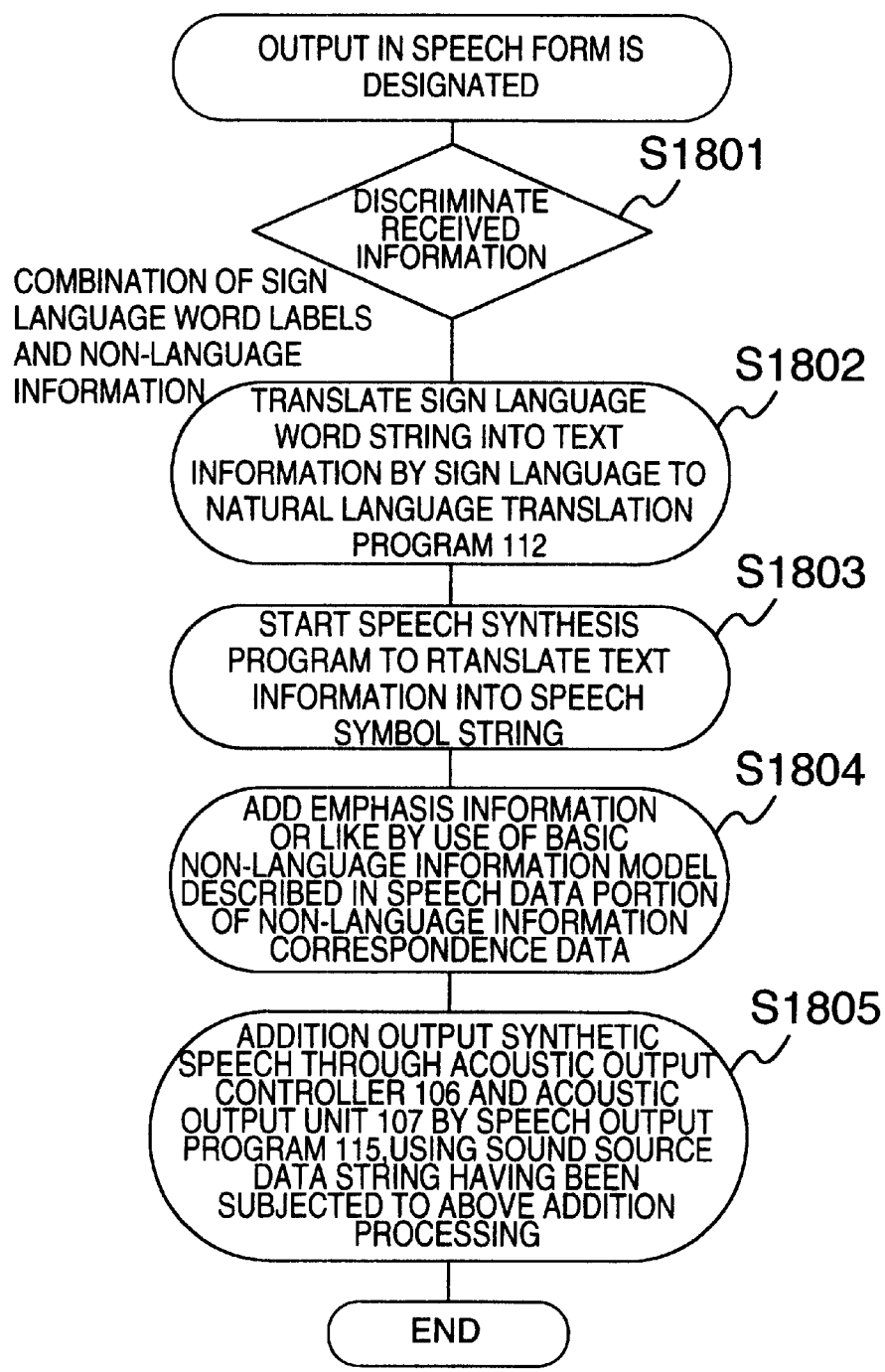
FIG. 18 is a flow chart of a mail reception processing with speech output according to an embodiment of the present invention.

Next, an output processing performed in the case where a user selects a speech form as the output mode, will be described in reference to FIG. 18. Similarly to the case shown in FIG. 16, received information is discriminated (step S1801). In the case where the received information is the combination of a sign language word label string and non-language information, the sign language to natural language translation program 112 is started, in a manner similar to that in the case of the output mode in the text form shown in FIG. 17, so that the sign language word label string is translated into text information in which the word label string is divided into words (step S1802).

Thereafter, a speech synthesis program 118 (FIG. 1) is started to translate the text information into a phonetic alphabet string by use of a technique disclosed by, for example, Japanese Patent Application No. 9-205773 filed on Jul. 31, 1997 and entitled "SPEECH SYNTHESIS DEVICE WITH SPEAKER ADAPTIVE FUNCTION" (corresponding to JP-A-11-52987 laid open on Feb. 26, 1999) (step S1803). Further, sound source data 123 (FIG. 1) is used to extract a sound source data string corresponding to the phonetic alphabet string by the speech synthesis program 118 and non-language information is added by performing an operation in which the duration of each sound source in the extracted sound source data string and the duration of silence between words are elongated and the vocal sound duration of a word immediately preceding emphasis is elongated in an extent from the beginning point of the word to the ending point thereof. Emphasis information or the like is added by use of the basic non-language information model 1004 described in the speech data portion of the non-language information correspondence data 122 (step S1804). The sound source data string subjected to the above addition processing is used to output a synthetic speech through the acoustic output controller 106 and the acoustic output unit 107 in accordance with a speech output program included in the speech input/output program 115 (step S1805).

With the foregoing embodiment, non-language information is extracted from modified data obtained through the user's editing of automatically generated original animation data, and the sign language word labels and the non-language information are sent by use of the communication means. On the receiver side, the sign language word labels and non-language information sent from the sender side are translated into data having an output form of sign language animation, text display or speech output which is set on the receiver side or the sender. Thereby, a user can acquire mail message information in a data form which he or she likes.

For the translation of data form, there is prepared non-language information correspondence data concerning sign language information, text information and speech information. In other words, the non-language information has corresponding data between sign language information, text information and speech information and the reference to each corresponding data can be made by use of a symbol number. Thereby, it becomes possible to acquire a relationship or correspondence between non-language information in the forms of plural media.

A difference value between animation data obtained through the user's addition of emphasis representation and/or feeling representation and the original animation data before addition is determined, and emphasis representation information and/or feeling representation information is extracted on the basis of the determined difference value. Thereby, it becomes possible for the user to automatically estimate an emphasis portion and/or feeling representation portion without inputting the emphasis representation portion and/or feeling representation portion as a symbol.

In the case where a user inputs a natural language text and sends the inputted text, the receiver side analyzes the received text by use of morphological analysis means. Adjacent ones of divisional words obtained as the result of analysis are coupled. The divisional word may further be divided. Natural language words in natural language word to sign language word label correspondence data stored in information storage means are divided. The coupled words or the divisional words are collated with the natural language word to sign language word label correspondence data to extract sign language word labels so that a sign language word label string is generated. Thereby, it is possible to readily convert natural language representation to sign language representation.

The addition of emphasis information and/or feeling information may also be enabled on a text. When an emphasis portion or feeling representation portion as non-language information is designated or specified on the text, the designated portion is stored as an emphasis portion or feeling representation portion together with a flag indicative of non-language information.

In the case where a user inputs a speech, vocalization information is A/D-translated. Vocal sound information, sound pressure information, sound pitch information and time information are acquired from the translated vocalization information. Further, non-language information including emphasis information and/or feeling information is extracted from the contents of the inputted speech and the extracted non-language information is displayed as a sign language representing animation. Thereby, emphasis information and/or feeling information in text information can also be displayed in the form of an animation.

In the case where a user designates the output in the form of a speech, sign language animation information is translated into speech information through speech synthesis by use of sign language word labels and non-language information inclusive of emphasis representation information and/or feeling representation information and the resultant speech information is outputted for the user. Thereby, emphasis information and/or feeling information as inputted as sign language information can be acquired as speech information. This enables the communication of non-language information in the form of a language which is used ordinarily.

Although the mode of the output of a received mail (sign language animation mode, text mode, speech mode, etc) is established on the receiving side in the above-described embodiments, it may be established on the sending side as well.

What is claimed is:

1. A sign language information processing apparatus capable of sign language mail communication, comprising:

information input means capable of inputting at least text information;

animation information generation means for generating sign language animation information by use of sign language word label information;

information storage means coupled with said information input means and said animation information generation means;

information display means coupled with said information input means, said animation information generation means and said information storage means;

a memory for storing non-language information correspondence data represented by a medium of each of sign language information, text information and speech information, said non-language information including at least one of emphasis representation and feeling representation;

communication means for sending and receiving said sign language word label information and said non-language information through a communication line;

non-language information extraction means for extracting said at least one emphasis representation and feeling representation from modified information, wherein said modified information includes original language animation information generated by said animation information generation means from sign language word label information inputted by said information input means and said at least one of emphasis representation and feeling representation added to the original sign language animation information, said non-language information extracting means being operative to determine a difference between said original sign language animation information and said modified information by use of the non-language information correspondence data stored in said memory and to extract said at least one of emphasis representation and feeling representation on the basis of the determined difference; and sign-language data translation means for translating the sent sign language word label information and non-language information into output data in the form of text data or speech data.

2. A sign language information processing apparatus according to claim 1, wherein said non-language information extraction means includes characteristics extraction means for detecting at least one of a pose point, an acceleration value between pose points, the stay duration of a pose point, the duration of a word, the ratio of the duration of a word to the duration of a text, and a syntax as characteristics from said modified information data, and difference value determination means for determining a difference value between the characteristics detected by said characteristics extraction and characteristics having already been entered as basic data.

3. A sign language information processing apparatus according to claim 1, further comprising:

morphological analysis means for dividing character string information of text information inputted by said information input means into word information which includes information of parts of speech and conjugations;

adjacent-word coupling means for coupling adjacent ones of divisional words obtained by said morphological analysis means;

in-word division means for further dividing the divisional word;

word division means for dividing natural language words in natural language word to sign language word labels stored in said information storage means; and natural language word to sign language word label correspondence data collation means for collating the coupled words or the divisional words with said natural language word to sign language word label correspondence data to extract sign language word labels.

4. A sign language information processing apparatus according to claim 1, further comprising:

sign language animation data editing means including means for designating information of a position on a screen of said information display means, said sign language animation data editing means specifying at least one of an emphasis portion and a feeling added portion indicative of non-language information on the text information inputted by said information input means;

means for storing the specified portion as the at least one of an emphasis portion and a feeling added portion; and means for adding non-language information to sign language animation data corresponding to said at least one of an emphasis portion and a feeling added portion.

5. A sign language information processing apparatus according to claim 1, wherein said information input means includes speech input means for inputting vocalization information, A/D translation means for A/D-translating said vocalization information, and speech recognition means for acquiring vocal sound information, sound pressure information, sound pitch information and time information of the inputted vocalization information from the A/D-translated information, and said speech recognition means extracts non-language information from a word string, the duration of silence between words and the duration of a vocal sound in the vocalization information and includes speech to sign language non-language information translation means for displaying said non-language information as a sign language representing animation.

6. A sign language information processing apparatus according to claim 1, wherein said output data form is selected on an information receiving side or on an information sending side.

7. A sign language information processing apparatus according to claim 1, further comprising speech synthesis means for synthesizing a speech from character string information, said speech synthesis means including sign language animation to speech translation means for translating sign animation information into speech information through the speech synthesis by controlling the duration of a word, the duration of silence between words and the duration of each vocal sound in a word by use of the non-language information extracted by said non-language information extraction means.

8. A sign language information processing apparatus comprising:

a display unit;

an information input section;

means for generating sign language animation information from a sign language word label string inputted into said information input section;

a first memory for storing non-language information correspondence data represented by a medium of each of sign language information, text information, and speech information, said non-language information including at least one of emphasis representation and feeling representation;

means for driving said display unit to display a sign language animation corresponding to said sign language animation information, each sign language word label of said sign language word label string defining said sign language animation, for editing items for specifying manual signs or sign gestures corresponding to the respective sign language word labels on said display unit, and for changing said editing item to add said non-language information inclusive of said at least one of emphasis information and feeling information to said sign language animation information, thereby generating modified sign language animation information;

means for extracting said at least one of emphasis representation and feeling representation from said modified sign language animation information, said extracting means being operative to determine a difference between said generated sign language animation information and said modified information by use of the non-language information correspondence data stored in said first memory and to extract said at least one of emphasis representation and feeling representation on the basis of the determined difference;

a second memory for storing the inputted sign language word label string and the extracted non-language information;

means for reading said sign language word label string and said non-language information from said second memory and coupling the read non-language information with the read sign language word label string; and an information output section for receiving an output from said coupling means.

9. A sign language information processing apparatus according to claim 8, further comprising:

means for translating the read sign language word label string into a natural language text;

means for translating said natural language text into a phonetic alphabet string; and means for coupling the read non-language information with a sound source data string corresponding to said phonetic alphabet string.

10. A sign language information processing apparatus comprising:

an information input section;

means for recognizing speech information inputted to said information input section and including non-language information including at least one of emphasis information and feeling information to generate character strings corresponding to said speech information;

a first memory for storing non-language information correspondence data represented by a medium of each of sign language information, text information, and speech information, said non-language information including said at least one of emphasis representation and feeling representation;

means for extracting said non-language information from the generated character strings, said extracting means being operative to distinguish said non-language information in the generated character strings and said modified information by use of the non-language information correspondence data stored in said first memory and to extract said at least one of emphasis representation and feeling representation on the basis of the distinction;

a second memory for storing the generated character strings and the extracted non-language information;

means for reading said character strings from said memory and translating the read character strings into a sign language word label string;

means for reading said non-language information from said memory and coupling the read non-language information with said sign language word label string; and an information output section for receiving an output from said coupling means.

11. A sign language information processing apparatus comprising:

a display unit;

an information input section;

means for generating sign language animation information from a sign language word label string inputted into said information input section;

a first memory for storing non-language information correspondence data represented by a medium of each of sign language information, text information, and speech information, said non-language information including at least one of emphasis representation and feeling representation;

means for driving said display unit to display a sign language animation corresponding to said sign language animation information, each sign language word label of said sign language word label string defining said sign language animation, and editing items for specifying manual signs or sign gestures corresponding to the respective sign language word labels on said display unit and changing said editing item to add non-language information inclusive of said at least one of emphasis information and feeling information to said sign language animation information, thereby generating modified sign language animation information;

means for extracting said non-language information from said modified sign language animation information, said extracting means being operative to determine a difference between said generated sign language animation information and said modified information by use of the non-language information correspondence data stored in said first memory and to extract said at least one of emphasis representation and feeling representation on the basis of the determined difference;

a second memory for storing the inputted sign language word label string and the extracted non-language information;

means for reading said sign language word label string from said memory and translating the read sign language word label string into a natural language text;

means for translating said natural language text into a phonetic alphabet string;

means for reading said non-language information from said memory and coupling the read non-language information with a sound source data string corresponding to said phonetic alphabet string; and an information output section for receiving an output from said coupling means.

* * * * *